United States Patent
Sharma et al.

(10) Patent No.: US 10,776,577 B2
(45) Date of Patent: Sep. 15, 2020

(54) SYSTEMS AND METHODS FOR DIAGNOSING PROBLEMS FROM ERROR LOGS USING NATURAL LANGUAGE PROCESSING

(71) Applicant: Open Text Corporation, Waterloo (CA)

(72) Inventors: Ankur Sharma, Bangalore (IN); Ravikanth Somayaji, Bangalore (IN)

(73) Assignee: Open Text Corporation, Waterloo (CA)

( * ) Notice: Subject to any disclaimer, the term of this patent is extended or adjusted under 35 U.S.C. 154(b) by 34 days.

(21) Appl. No.: 16/013,635

(22) Filed: Jun. 20, 2018

(65) Prior Publication Data

US 2019/0005018 A1    Jan. 3, 2019

Related U.S. Application Data

(60) Provisional application No. 62/527,183, filed on Jun. 30, 2017.

(51) Int. Cl.
  *G06F 17/27* (2006.01)
  *G06F 40/205* (2020.01)
  (Continued)

(52) U.S. Cl.
  CPC .............. *G06F 40/205* (2020.01); *G06F 8/70* (2013.01); *G06F 16/3329* (2019.01);
  (Continued)

(58) Field of Classification Search
  CPC ..................................................... G06F 17/02
  (Continued)

(56) References Cited

U.S. PATENT DOCUMENTS

| 2007/0162447 A1* | 7/2007 | Joshi ....................... G06F 16/35 |
| 2014/0201702 A1* | 7/2014 | Kaplinger ................. G06F 8/76 |
| | | 717/101 |

(Continued)

OTHER PUBLICATIONS

Li, Weixi "Automatic Log Analysis using Machine Learning: Awesome Automatic Log Analysis Version 2.0". Uppsala University Publication, 2013 (Year: 2013).*

(Continued)

*Primary Examiner* — Jesse S Pullias
(74) *Attorney, Agent, or Firm* — Sprinkle IP Law Group

(57) ABSTRACT

Disclosed is a solution for diagnosing problems from logs used in an application development environment. A random sample of log statements is collected. The log statements can be completely unstructured and/or do not conform to any natural language. The log statements are tagged with predefined classifications. A natural language processing (NLP) classifier model is trained utilizing the log statements tagged with the predefined classification. New log statements can be classified into the plurality of predefined classifications utilizing the trained NLP classifier model. From the log statements thus classified, statements having a problem classification can be identified and presented through a dashboard running in a browser. Outputs from the trained NLP classifier model can be provided as input to another trained model for automatically and quickly identifying a type of problem associated with the statements, eliminating a need to manually sift through tens or hundreds of thousands of lines of logs.

20 Claims, 6 Drawing Sheets

(51) Int. Cl.
  *G06F 8/70* (2018.01)
  *G06N 20/00* (2019.01)
  *G06F 16/332* (2019.01)
  *G06F 40/30* (2020.01)
  *G06F 40/40* (2020.01)
(52) U.S. Cl.
  CPC .............. *G06F 40/30* (2020.01); *G06F 40/40* (2020.01); *G06N 20/00* (2019.01)
(58) Field of Classification Search
  USPC .................................................. 704/1, 9, 10
  See application file for complete search history.

(56) References Cited

U.S. PATENT DOCUMENTS

| | | | | |
|---|---|---|---|---|
| 2015/0120302 A1* | 4/2015 | McCandless | ....... | G10L 15/1815 704/257 |
| 2015/0242396 A1* | 8/2015 | Su | ....... | G06F 17/2705 704/2 |
| 2016/0034445 A1* | 2/2016 | Setayesh | ....... | H04L 51/046 704/9 |
| 2016/0042275 A1* | 2/2016 | Dettman | ....... | G06F 11/366 706/46 |
| 2017/0004184 A1* | 1/2017 | Jain | ....... | G06F 17/2735 |

OTHER PUBLICATIONS

"EMC Documentum xCP Solution Development Platform", EMC Corporation, Data Sheet H4699.3, 2013, 4 pgs.
"EMC® Documentum® xCelerated Composition Platform," Deployment Guide, Version 2.2, EMC Corporation, 2015, 184 pgs.
"Open Text™ Documentum® xCelerated Composition Platform Designer Help," User Guide, Version 16.4, Open Text Corporation, 2018, 538 pgs.

* cited by examiner

SYSTEMS AND METHODS FOR DIAGNOSING PROBLEMS FROM ERROR LOGS USING NATURAL LANGUAGE PROCESSING

CROSS-REFERENCE TO RELATED APPLICATION(S)

This application claims a benefit of priority under 35 U.S.C. § 119(e) from U.S. Provisional Application No. 62/527,183, filed on Jun. 30, 2017, entitled "SYSTEMS AND METHODS FOR DIAGNOSING PROBLEMS FROM ERROR LOGS USING NATURAL LANGUAGE PROCESSING," which is fully incorporated by reference herein for all purposes.

TECHNICAL FIELD

This disclosure relates generally to the field of application development. More particularly, this disclosure relates to systems, methods, and computer program products for diagnosing problems during application development, deployment, and/or execution.

BACKGROUND OF THE RELATED ART

An execution (or error) log contains the vital information and is often the only source of information that captures the checkpoints of program execution. However, such a log file often contains massive amounts of detailed information (e.g., hundreds of thousands of lines, statements, messages, sentences, etc.), making it extremely difficult for an investigator to quickly and efficiently find particular log statements or messages that might be useful in diagnosing problems during application development, deployment, and/or execution.

SUMMARY OF THE DISCLOSURE

Diagnosing execution problems can become significantly easier and faster if statements of interest in an execution or error log (interchangeably referred to herein as a "log" or "error log") can be discovered quickly. However, as noted above, discovering such log statements (which can also be referred to as "messages" or "sentences") can be a difficult challenge due at least to the size of the logs and the amount of detailed information often contained in such logs.

An objective of the invention is to provide a technical solution to this challenge. In embodiments disclosed herein, this object can be achieved by leveraging machine learning and natural language processing to quickly and efficiently identify log statements of interest from execution or error logs to facilitate diagnosing execution problems.

In some embodiments, a method of diagnosing execution problems from logs can include collecting and/or creating training data. For example, in some embodiments, training data can be generated by taking a random sample of actual error logs and tagging log statements. Each log statement in the random sample is tagged with a classification. There can be a plurality of classifications or categories. As a non-limiting example, a log statement can be classified as providing environment information, an execution result of a particular operation, a specific problem that caused program failure, or a generation information log statement. In some embodiments, these classification tags can be used to provide environment information, execution result, problem, and general log. However, these classification tags are not mandatory. Skilled artisans can derive that any system equivalent to the ones disclosed herein may have an entirely different set of classification tags.

In some embodiments, log statements thus tagged can be used to train a classifier model. The classifier model thus trained can automatically classify log statements in log files and efficiently and quickly identify, isolate, or otherwise filter out log statements indicative of execution problems. The diagnosed problems can be displayed on a display device or screen, included in a notification that is sent or communicated to a user, and/or provided to a downstream application such as an analytical tool.

In some embodiments, the classified training data (e.g., tagged log statements) can be provided to a natural language processing (NLP) processor. The NLP processor can parse through the training data and determine how likely, with a reasonable certainty, different log statements would be categorized or classified into a given classification. This determination can be based on a frequency distribution of various words and phrases occurring in the log statements in the random sample. In this disclosure, an NLP classifier model thus trained can be referred to as a trained model. A trained model can be serialized and persisted for further use.

In some embodiments, processing a new log may include performing problem discovery and diagnostics utilizing the trained model. In some embodiments, unlike other NLP models, the trained model does not look for grammatical errors and is not required to pass only valid sentences. Instead, the trained model disclosed herein is operable to automatically, efficiently, and quickly look for, locate, identify, or otherwise diagnose problems in the logs of a particular problem domain.

In some embodiments, a log can be parsed sentence-wise and each log statement is processed utilizing a trained model for classification. The trained model is operable to classify each log statement in one of the categories provided to it during training. One pass of the log can provide a possible classification for each log statement in the log. The log statements that were classified as "Problem" any tag with equivalent meaning, or any tag of particular interest can be collected. The collected log statements can then be filtered as required and presented to a user (e.g., an investigator) in many ways, for instance, via a graphical user interface (GUI) or email. This method can enable investigators to view log statements of interest directly and quickly, without having to manually sift through tens or hundreds of thousands of lines of logs. A technical effect provided by this method is that problem diagnostics can be streamlined significantly which, in turn, can reduce cost in time and computational resources.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained further with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Logs used in application development environments typically contain statements that come from various sources. These log statements are not structured. Further, such log statements may or may not conform to grammars—they are not necessarily grammatically correct sentences or flow like natural language sentences. Further, the amount of statements in a log can be huge. For example, the number of unique statements in a log may easily be in the thousands (e.g., tens or hundreds of thousands) and, for complex systems, may be even more. As new statements are added to a log, it becomes more and more difficult to keep track of them and/or to find particular statements that may facilitate in, for instance, diagnosing problems in program execution. For platforms that provide accelerated application composition, development, and deployment, it may be desirable to quickly, efficiently, and effectively diagnose problems from error logs in a way that is agnostic of the exact statements.

In an accelerated application development platform, instead of writing custom code, a graphical application design environment may run on a computing device for an application designer (e.g., a non-programmer or non-technical user) to compose an application using prebuilt user interface (UI) widgets and reusable components. Such an accelerated application development platform may include a combination of software and hardware components implementing a library of such prebuilt UI widgets (e.g., "drag-and-drop" user-friendly UI elements, graphical composition tools, etc.), reusable components (e.g., process activity templates, form controls, etc.), and data services for exchanging data with, and trigger actions, at runtime, in enterprise systems such as customer relationship management systems (CRMs), enterprise resource planning systems (ERPs), database servers, and so on.

Figure 1:
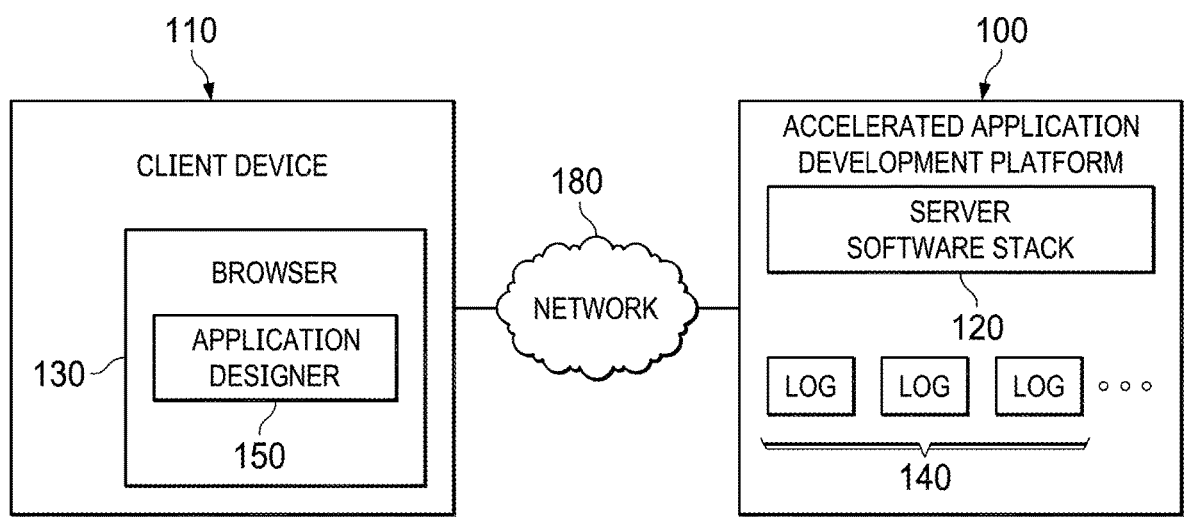
FIG. 1 depicts a diagrammatic representation of an application development platform on which embodiments disclosed herein may be implemented.

FIG. 1 depicts a diagrammatic representation of an application development platform on which embodiments disclosed herein can be implemented. In this example, accelerated application development platform 100 may include application designer 150 that can run in a browser environment provided by browser 130 running on client device 110. The xCelerated Composition Platform (xCP) from Open Text Corporation, headquartered in Canada, can be a non-limiting example of accelerated application development platform 100 and OpenText™ Documentum® xCP Designer can be a non-limiting example of application designer 150. The xCP integrates process design, user-experience definition, dynamic report creation, information modeling, and comprehensive data services into a single, easy-to-use, graphical, "drag-and-drop," design environment. The xCP Designer includes a full library of prebuilt UI widgets, business-process activity templates, and data services that can be used by their uses to compose application.

In some embodiments, application designer 150 can contain a full library of prebuilt UI widgets, business-process activity templates, and data services for composing applications. An application thus composed can leverage any number of business processes, information models, data sources, user interfaces, and so on provided by application designer 150.

Figure 2A:
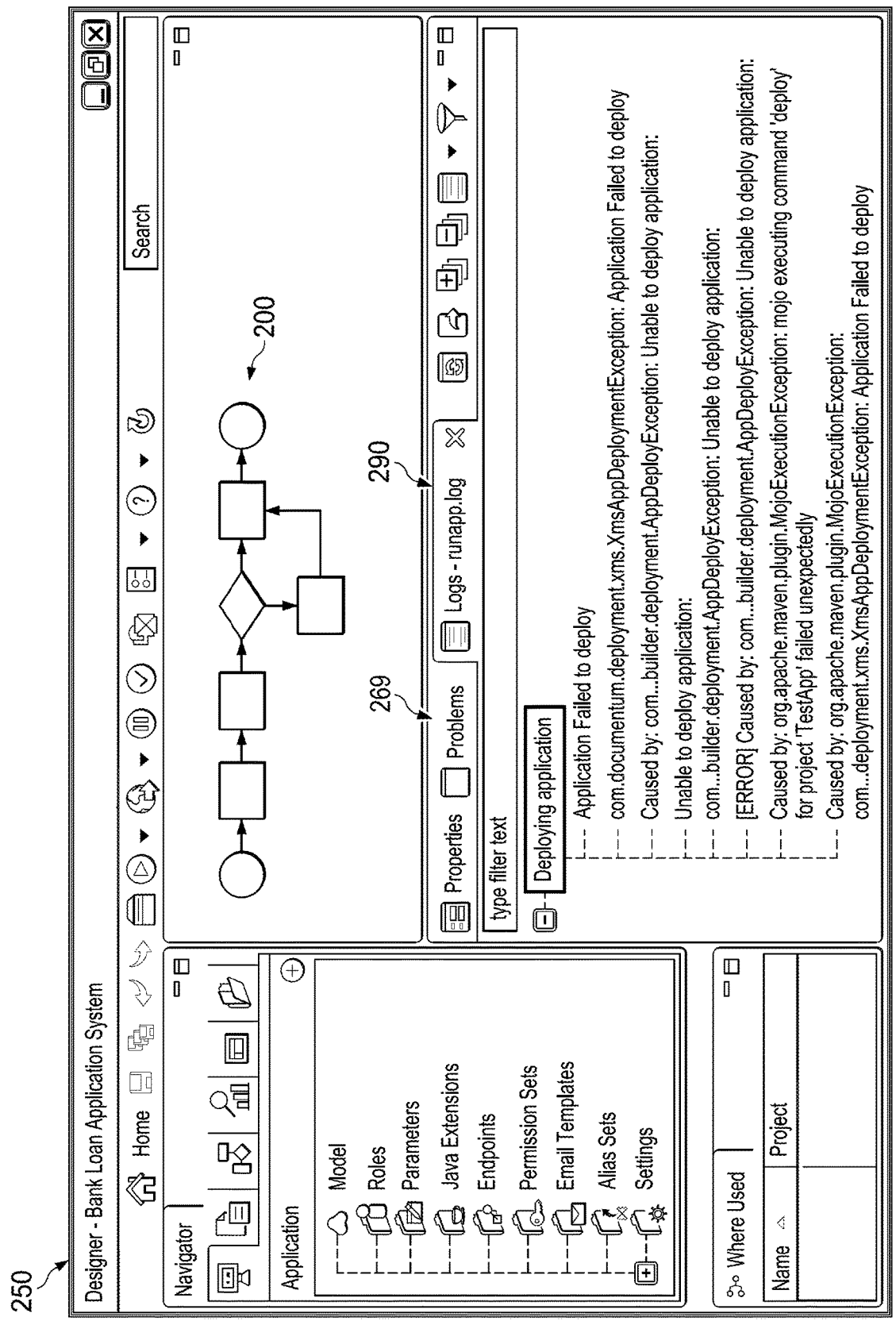
FIG. 2A depicts a diagrammatic representation of a graphical user interface of an example of an application designer according to some embodiments.
Figure 2B:
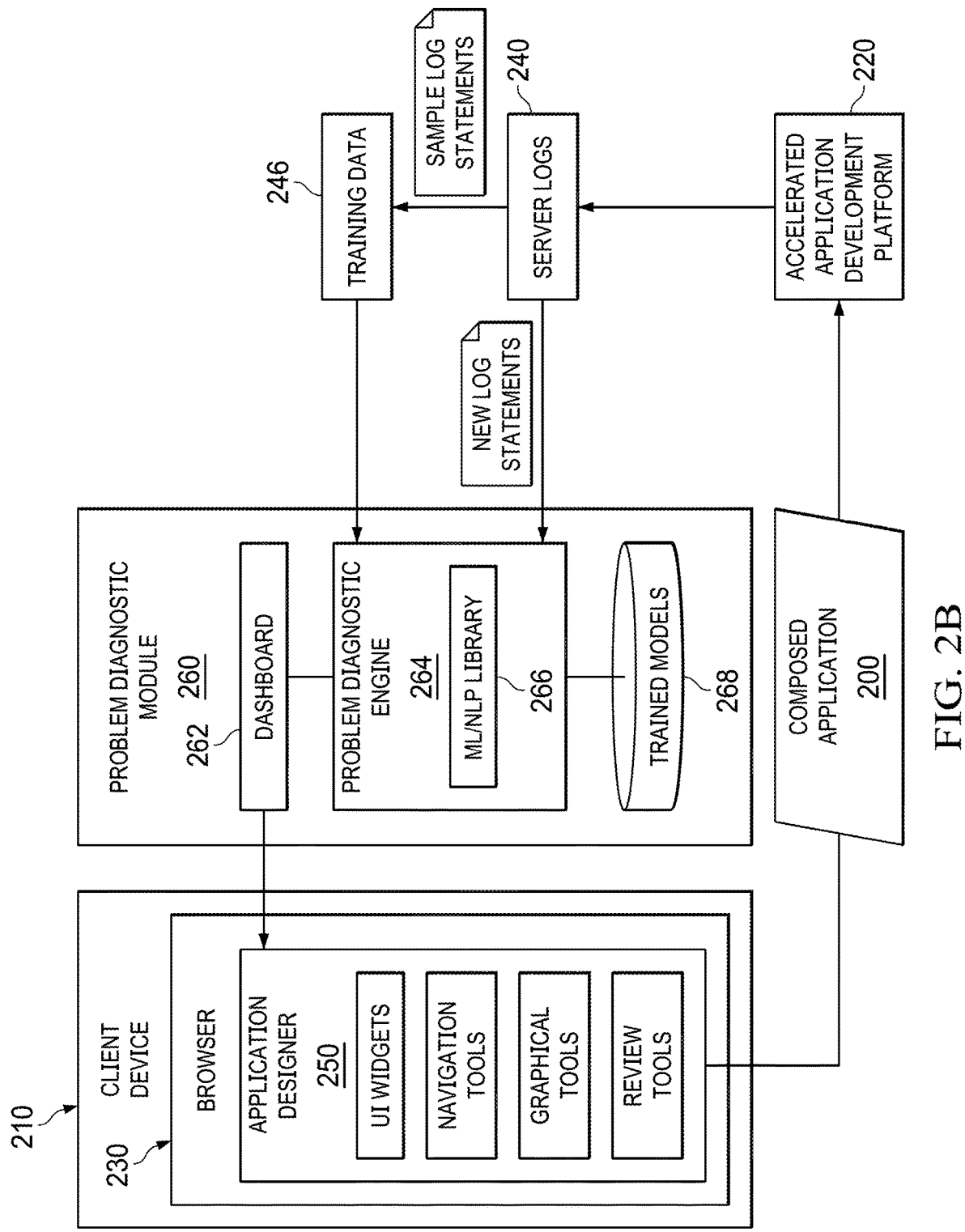
FIG. 2B depicts functional blocks of an example of an application designer and a problem diagnostic model for log statement problem diagnoses using machine learning and natural language processing according to some embodiments.

FIG. 2A and FIG. 2B depict a diagrammatic representation of a graphical user interface and functional blocks of an example of application designer 250 according to some embodiments. As illustrated in FIGS. 2A-2B, application designer 250 (which can implement an embodiment of application designer 150 shown in FIG. 1) may include predefined UI widgets and reusable components such as navigational tools (e.g., "Navigator" which, as illustrated in the example of FIG. 2A, may provide access to Java services, permission settings, various types of templates such as email templates, process activity templates, etc., models, parameters, and configuration settings), application modeling tools (e.g., graphical composition tools), and review tools (which, in the example of FIG. 2A, are accessible via "Properties" tab, "Problems" tab 269, "Logs" tab 290, etc.).

Instead of having to write custom programming code to design an application, a non-technical user can use the predefined UI widgets and reusable components of application designer 250 to compose an application (e.g., application 200) at design time. Such a composed application may represent a design of a workflow application, a loan processing application, an insurance claim processing application, etc. that is yet to be built and deployed. Each application composed using application designer 250 may represent a grouping of all of the projects that make up that application. Initially, such an application may begin with a default project referred to as an "application project." A "project," in this case, may refer to a reusable set of models and pages that can be used across different applications. Such a project may not be validated until an attempt is made to deploy the application. When application designer 250 performs a validation on an application (at design time), any application-level problems and warnings of the application may be shown immediately in "Problems" tab 269.

Once an application is validated, it can be deployed into a deployment environment. In this disclosure, an example of a deployment environment may refer to an accelerated management service (xMS) configuration that defines a particular content server and all the components necessary to run the application. Skilled artisans can appreciate that there can be many different application deployment methods, for instance, from the design time environment within application designer 250 or using xMS tools (e.g., xMS agent) in a production environment. As a non-limiting example, responsive to a user selecting "Run Application" through application designer 250, application 200 can be deployed to a deployment environment (e.g., within accelerated application development platform 220, explained below). Accelerated application development platform 220 can be an implementation of accelerated application development platform 100.

A run configuration file may define how the deployment is conducted (e.g., which runtime or target environment to use and which deployment options to use, etc.). For example, application 200 composed using application designer 250 may require a sequence of complicated steps to execute in different contexts. Accordingly, application designer 250 may provide a non-technical user with the ability to debug this process at design time, allowing application 200 to be tested and potential issues be identified before application 200 is deployed to a production environment.

For the sake of illustration, an application such as application 200 composed using application designer 250 may be deployed by application designer 250 into a development environment or a test environment. As a non-limiting example, application components can be deployed to a development environment across two or more physical or virtual server machines, an example of which is illustrated in FIG. 3.

In the example of FIG. 1, a composed application may be deployed from application designer 150 running within browser 130 on client device 110 over network 180 to server machines running on accelerated application development platform 100. These server machines may embody server software stack 120. Skilled artisans appreciate that server software stack 120 represents a group of programs that work in tandem or as a set to produce a result or achieve a common goal. In this case, server software stack 120 is operable to support an application composed using application designer 150.

Figure 3:
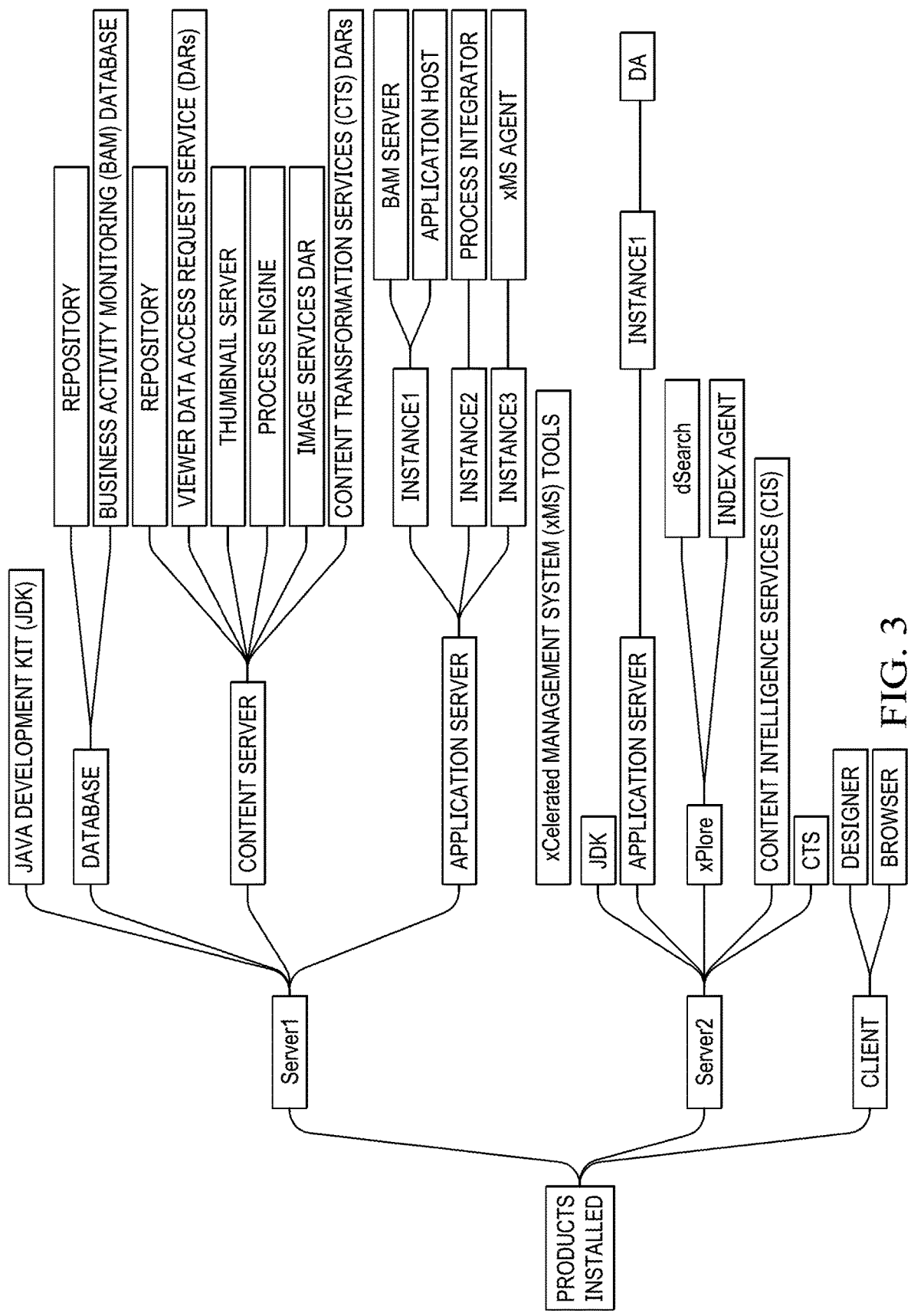
FIG. 3 illustrates an example of a deployment of an application composed using an application designer according to some embodiments.

As a non-limiting example, server software stack 120 may implement programs running on Server1 and Server2 shown in FIG. 3, for instance, application servers, database servers, content servers, Java method servers (e.g., Java Development Kit), process engines, etc. (collectively referred to herein as "server components"). Skilled artisans also appreciate that, during operation (e.g., during a deployment execution operation), these server components may store information in logs (e.g., logs 140). For example, the Content Server shown in FIG. 3 may store Process Engine installation error details in a setup error log file in a Process Engine installation folder. As another example, an Application Server may log any application-level problems, execution results, operation notes, and/or general information in a log file. Further, application designer 150 may utilize debug logs (e.g., "xcpdesigner.log," "xms-full.log," etc.).

The logs may be set to various sizes. For example, a transaction log for a database server may be set to 500 MB. The log files may reside at different locations or a single location (e.g., a logs folder). As a non-limiting example, the log files may be maintained by an accelerated management system (xMS). In some cases, the log files may be reviewed by an investigator.

In this disclosure, an investigator may refer to someone who reviews log statements in log files (e.g., logs 140) and identifies potential problems, for instance, program execution errors. By manually reviewing the logs, statement by statement, and perhaps doing a text-based keyword or string search, an investigator may be able to discover and diagnose problem(s). However, this is a tedious and time-consuming process that may not be efficient or effective.

For example, as discussed above, a user can deploy an application from application designer 250 (e.g., by selecting the "Run Application" function on the main toolbar). If the application deployment fails, an investigator may check the message in the deployment dialog box and investigate the log files. In this case, the investigator may check the log files of the "Run Application" function (e.g., "runapp.log") and the xMS agent (e.g., located in \webapps\xms-agent\WEB-INF\logs for setup and configuration issues). If the runtime system that executes the "Run Application" function cannot find certain properties and/or preferences of application 200 (e.g., in a property or preference file such as "transformation.properties" or "preferences.xml"), the system records an error message in a specified log file (e.g., a xcpdesigner.log or runapp.log file) of the application. Thus, the investigator may need to check the relevant log file (e.g., relevant log files that are specific to application designer 250 (e.g., "xcpdesigner.log" or "runapp.log" for xCP Designer) for issues relating to properties and/or preferences of the application. If content for application 200 (e.g., from the Content Server over a data connection or a service provided by the Content Server) is still not consistently available, the investigator may need to check the content transformation service (CTS) log files at the path specified in the property file (e.g., "log4j.properties") of application 200.

Since this problem diagnostic process is mainly a manual process, it is also prone to human errors such as overlooking possible problems and/or skipping log statements that may actually contain important information. The drawbacks of this manual approach are further exacerbated by the ever-increasing amount of information contained in each log file. In the case of an accelerated application development platform such as accelerated application development platform 100, properly and quickly diagnosing problems from error logs can be even more challenging due to the level of complexity and difficulty inherent in integrating different client and server components (see e.g., FIG. 3) in a manner that seamlessly ties together different computing environments (e.g., design time, development environment, test environment, deployment environment, production environment, runtime environment, etc.).

Further, because these error logs are used by different client and server components, there is not a standard or uniform way in how and/or what information is collected in these logs. Nor is there a standard or uniform format, data structure, or grammar that defines how that information is stored in the log files. Rather, a sentence in a log file may generally have a timestamp, some kind of identifier, and a message or statement which could take any form.

As a non-limiting example, a log file may contain the following sentences separated by sentence returns:
[timestamp] [identifier] Setting server protocol to HTTP
[timestamp] [identifier] Finished validating Artifact data models in project 'ap2801' in . . . 1373 ms
[timestamp] [identifier] Failed to instantiate AcmeManager. Please make sure that Acme server is installed
[timestamp] [identifier] [INFO] Running pre deploy phase As the above example illustrates, log data could contain anything from sentences containing various combinations of English words and technical data, all technical data, a hexadecimal number, and/or completely unstructured data. Such unstandardized log files can have hundreds, thousands, tens of thousands, hundreds of thousands, or more unique statements. It is not possible to standardize log data because it is not possible to standardize highly complex systems (see e.g., FIG. 3) that produce the log data. Also, different modules may emit different log structures due to the fact that they have different designs and/or were designed by different teams/programmers.

The lack of uniformity and/or standardization in log data also means that it is extremely difficult to perform textual searches for problem analyses and diagnoses. To be effective, an investigator would need to know what to look for. However, because log statements are not standardized, it is not possible for an investigator to know exactly what to look for. This makes it extremely difficult to perform textual searches. Further, textual searches entail processing a huge amount of log data to try to find a particular string. This can take a very long processing time and require a large amount of computational resources such as memory and processor power.

Figure 4:
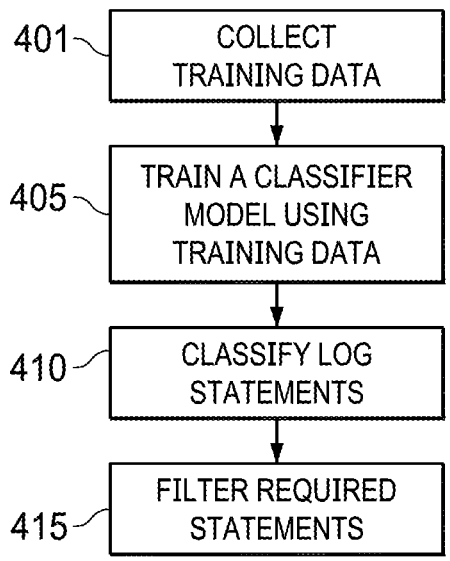
FIG. 4 is a flow chart illustrating an example of a method for diagnosing problems from logs according to some embodiments.

Embodiments disclosed herein can provide a new way of diagnosing problems from logs. FIG. 4 is a flow chart illustrating an example of method 400 for diagnosing problems from logs. As an example, method 400 may be utilized for diagnosing program execution problems. Those skilled in the art appreciate that method 400 may be implemented for diagnosing other types of problems.

In some embodiments, method 400 may include collecting or creating training data (401), training or generating a classifier model utilizing the training data (405), classifying log statements utilizing the classifier model (410), and isolating, identifying, or filtering required statements (e.g., problem statements) (415). Step 401 is further explained below with reference to FIG. 5. Step 405 is further explained below with reference to FIG. 6.

In this way, a system implementing method 400 can automatically, efficiently, and quickly diagnose problems from statements in the log. The system can consume any legacy log files, such as those generated before this invention or those generated using the systems before this invention. The diagnosed problems can then be presented, for instance, displayed on a display device or screen, included in a notification that is sent or communicated to a user, and/or provided to a downstream application such as an analytical tool.

Creating the right training data (401) can be very crucial for successfully diagnosing problems from logs. As further explained below with reference to FIG. 5, in some embodiments, this step may entail taking a random sample of actual logs. For instance, referring to FIG. 2B, a portion of server logs 240 generated in accelerated application development platform 220 can be randomly selected for use as training data 246 by problem diagnostic engine 264 of problem diagnostic module 260. The size of the random sample can be configurable to suit any use case. As a non-limiting example, about two thousand statements may be randomly sampled from tens or hundreds of thousands of statements in one or more logs.

Figure 5:
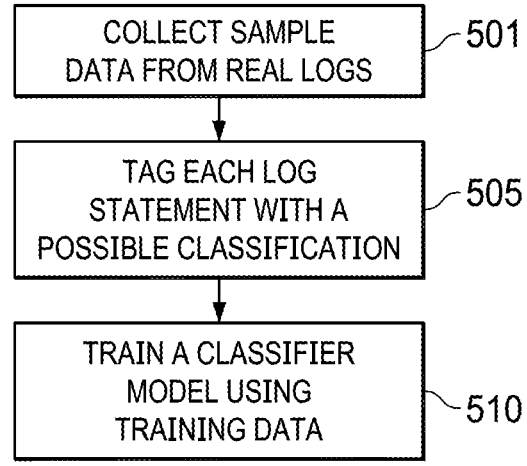
FIG. 5 is a flow chart illustrating an example of a method for creating training data according to some embodiments.

As illustrated in FIG. 5, in some embodiments, creating training data may include taking a random sample of actual error logs (501) and tagging each log statement in the random sample with a special classification or category (505). In some embodiments, these steps can be performed by problem diagnostic engine 264 of problem diagnostic module 260 shown in FIG. 2B. For instance, a log statement can be classified as providing environment information, an execution result of a particular operation, a specific problem that caused program failure, or a generation information log statement. Additionally or alternatively, a log statement can be classified to reflect certain processes (e.g., different results) in different points in time. The classifications can be domain-specific (e.g., for an information provider, a financial organization, a government agency, etc.) and/or specific to a problem type, priority, security sensitivity, etc. Problem diagnostic module 260 can run on a server computer in accelerated application development platform 220, on client device 210, or in a distributed manner (e.g., some functions of problem diagnostic module 260 may run on client device 210 and some functions of problem diagnostic module 260 may run on a server computer in accelerated application development platform 220).

As a non-limiting example, Table 1 below represents a sample table of classification. In the example of Table 1, the above four example log statements are classified as ENV (environment information), RESULT (execution result of a particular operation), PROBLEM (a specific problem that caused program failure), and LOG (a generation information log statement).

TABLE 1

| Classification | Log Statement |
| --- | --- |
| ENV | Setting server protocol to HTTP |
| RESULT | Finished validating Artifact data models in project 'ap2801' in . . . 1373 ms |
| PROBLEM | Failed to instantiate AcmeManager. Please make sure that Acme server is installed |
| LOG | [INFO] Running pre deploy phase |

Accordingly, training data thus created contains classified sample log statements from actual logs. In some embodiments, the classified sample log statements from actual logs (the training data from step 505) can be utilized to train a classifier model (510), as further explained below with reference to FIG. 6. In some embodiments, the classifier model can be a natural language processing (NLP) model.

NLP is a branch of computer science, artificial intelligence, and linguistics concerned with enabling computers to engage in communication using natural language(s). NLP can be used in machine learning (ML), which is a subfield of computer science that examines pattern recognition and computational learning theory in artificial intelligence. In ML, classification refers to the problem of identifying to which of a set of categories a new observation belongs, based on a training set of data containing observations (or examples) whose category membership is known. In ML, classification is considered an instance of supervised learning, i.e., learning where a training set of correctly identified observations is available. In supervised learning, each example in the training set includes an input object and a desired output value. A supervised learning algorithm analyzes the training data and produces an inferred function, which can be used for mapping new (previously unseen) examples. The supervised learning algorithm generalizes from the training data to determine (or reasonably predict) the class labels for the unseen instances. NLP, ML, and supervised learning are known to those skilled in the art and thus are not further described herein.

Figure 6:
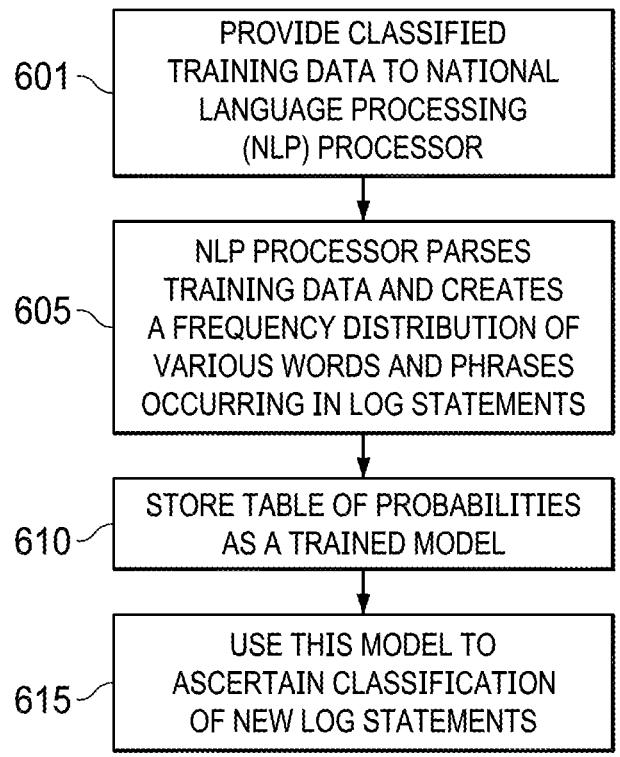
FIG. 6 is a flow chart illustrating an example of a method for generating classifier models according to some embodiments.

Embodiments disclosed herein can advantageously leverage a particular property of NLP for training or generating a NLP model that can automatically classify (newly collected, previously unseen) log statements leading to problem diagnostics. As illustrated in FIG. 6, in some embodiments, training or generating a NLP model for log statement problem diagnostics may include providing log statement training data (e.g., tagged log statements from step 505 described above) to a NLP processor (601).

In some embodiments, the NLP processor can be realized utilizing any suitable NLP library for model training and serialization. In some embodiments, the training or generation of a NLP model can be done by problem diagnostic engine 264 of problem diagnostic module 260 utilizing ML/NLP library 266. As a non-limiting example, a NLP processor (e.g., the Apache OpenNLP library) may include a set of ML-based tools typically used for processing human (natural) languages. The Apache OpenNLP library is not typically used for processing log statements. Rather, NLP techniques make use of various ML algorithms to create statistical NLP models for processing natural language text. These NLP models can then be used to process, for instance, parts of speech analyses.

In this case, the NLP processor is particularly configured for processing the classified training data and generating a trained NLP model (or trained NLP models) for log statement problem diagnostics. The NLP processor may support application programming interfaces (APIs) configured for accepting the training data specifically created utilizing the special classification or category discussed above and can parse through the training data and, as discussed below, compute the probabilities of different log statements being categorized into a given classification (605).

The NLP processor may include statistical NLP models that can be trained into a log statement classifier model. As part of this training (through supervised learning), the model-in-training parses through different sample log statements in the training data, generates a frequency distribution of various words and phrases occurring in the sample log statements, and computes, based on the frequency distribution, the probabilities (representing likelihoods) of such log statements being categorized into a given classification. In this disclosure, an NLP classifier model thus trained can be referred to as a trained model (or interchangeably as a classifier model). The NLP classifier model is then stored (e.g., in data store 268 shown in FIG. 2B) as a trained model (610). The trained model can then be serialized and persisted with the computed probabilities for future use in problem diagnostics from logs. The details of model training and serialization are known to those skilled in the art and thus are not further described herein.

The trained model is now ready for consumption (e.g., for automatic classification of new, previously unseen log statements for problem discovery and diagnostics) (615). In some embodiments, a new log (of any type, from any source) can be parsed sentence-wise to produce log statements and each log statement is given to a trained model for classification. The trained model is operable to classify, based on the pre-computed probabilities stored therein, each log statement in one of the categories or classifications provided to the trained model during its training. In some embodiments, one pass of a log may provide a possible classification for each log statement in the log.

The statements classified as "Problem" or any other tag with equivalent meaning can be collected and presented, for instance, via email or a graphical user interface on a display device or screen. In the example of an application designer (e.g., application designer 250 shown in FIGS. 2A, 2B), the problem diagnostic module may include a dashboard configured for presenting results (e.g., dashboard 262 shown in FIG. 2B may operate to present automatically diagnosed program execution problems through the "Problems" tab 269 shown in FIG. 2A) to an investigator to help the investigator to quickly analyze the error logs. This enables a user to view log statements of interest directly and quickly. Since users no longer have to manually sift through thousands of lines of logs, this solution provides a technical effect of making computer-implemented program execution problem diagnostics significantly more efficient and streamlined.

Steps described above may take place before build time (production) of a composed application (e.g., in an offline process on accelerated application development platform 100 independently of application designer 150 being deployed and installed on a client device). In the example of an application designer (e.g., application designer 150 or 250), a problem diagnostic module containing or accessible to trained models may be included. During the runtime or build time of a composed application, the problem diagnostic module may run a trained model. The trained model can identify, automatically and quickly identify, log statements of interest in a given classification.

Accordingly, in some embodiments, processing a log may include performing problem discovery and diagnostics utilizing a trained model. In some embodiments, a trained model does not look for grammatical errors and is not required to pass only valid sentences. Instead, a trained model disclosed herein is operable to look for keywords in the logs of a particular domain and recognize problems that it was trained (using sample log statements with predetermined classification tags or category tags added) to discover in the particular domain.

The above steps can facilitate the selection of particular log statements of interest, which can lead to significantly reduced time and effort in the discovery and diagnosis of potential problems. The time and effort needed for analyses of thus identified log statements can be further reduced by using a second statistical model which is specifically trained for advanced problem diagnostics.

In some embodiments, this training can be achieved by collecting, in a repository, known failures and their associated messages. Here, the messages can be referred to as statements that would appear in logs for these problems/failures. A corpus of training data can be created with each such statement associated with the kind of problem that they indicate. Like the previous step, the second statistical model is trained with this information and is persisted, for instance, in a data store.

In some embodiments, once the statements having a classification or category of interest (e.g., the "Problem" statements) are collected in the first pass as described above, they can be provided as input to the second model. The classifications provided by this second model can be more specific to various types of problems and thus can help identifying the exact kind of "Problem" with which these statements are associated. In this way, problems can be quickly, efficiently, and effectively discovered and diagnosed.

The approach disclosed herein can provide many benefits. For example, not all statements in a log would need to be known beforehand to properly analyze the log. Rather, good sampled training data can adequately train a model to classify the new statements properly. Further, analyses can be much faster than regular expressions as this approach does not work on string search but utilizes string hashes and probabilistic models. Also, log statements can easily be tagged for classification. For example, this can be done by taking a good sample of statements from actual logs (training data) and prefix each statement with an appropriate classifier tag.

Figure 7:
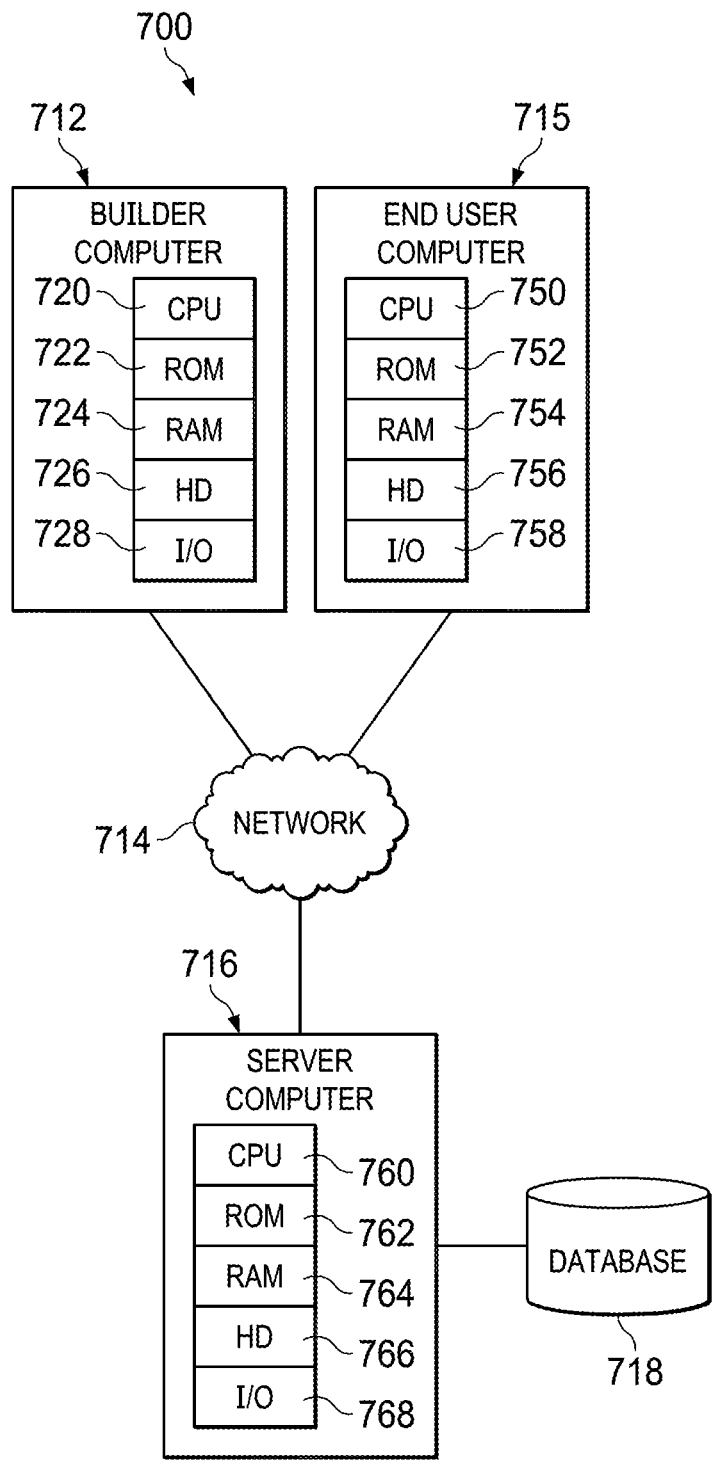
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to an application builder computer 712 (which can implement an embodiment of client device 110), an end user computer 715 (which can implement an embodiment of a user device running an application composed by application builder computer 712 using application designer 150), and a server computer 716 (which can implement an embodiment of accelerated application development platform 100). Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 712 may include data processing systems for application designers or builders whose jobs may require them to design, build, and/or compose applications that can then run on end user computer(s) 715.

Computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing various services over network 714. In some embodiments, trained models may be stored in data store or database 718. Many other alternative configurations are possible and known to skilled artisans.

Each of the computers in FIG. 7 may have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories may be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for diagnosing problems from logs, the method comprising:
    creating training data from logs used in an application development environment, the logs containing statements from a plurality of sources in an enterprise computing environment, the creating comprising taking a random sample of the statements in the logs and tagging log statements in the random sample with a plurality of predefined classifications, the creating performed by a problem diagnostic module, the problem diagnostic module running on a computer;
    training a natural language processing (NLP) classifier model utilizing the log statements tagged with the plurality of predefined classifications, the training performed by the problem diagnostic module, the training producing a trained NLP classifier model, wherein the trained NLP classifier is adapted to classify log statements into one or more of the plurality of each predefined classifications based on an NLP feature associated with the log statements;
    classifying new log statements into the plurality of predefined classifications utilizing the trained NLP classifier model, the classifying performed by the problem diagnostic module, the plurality of predefined classifications including a problem classification;
    identifying, from the new log statements thus classified, statements having the problem classification, the identifying performed by the problem diagnostic module; and
    presenting, by the problem diagnostic module, the statements having the problem classification through a dashboard running in a browser.

2. The method according to claim 1, wherein the statements contained in the logs from the plurality of sources comprise unstructured data that do not conform to any natural language.

3. The method according to claim 1, wherein the plurality of predefined classifications comprises at least one of environment information, an execution result of a particular operation, a specific problem that caused program failure, or a generation information log statement.

4. The method according to claim 1, wherein the training comprises parsing the training data, generating a frequency distribution of various words and phrases occurring in the log statements in the random sample, and computing, based on the frequency distribution, a probability of each of the log statements being classified into a given classification.

5. The method according to claim 4, wherein outputs from the trained NLP classifier model are provided as input to another trained model of the plurality of trained models for identifying a type of problem associated with the statements having the problem classification.

6. The method according to claim 1, wherein the trained NLP classifier model is one of a plurality of trained models.

7. The method according to claim 1, wherein the plurality of classifications is specific to the application development environment.

8. A system for diagnosing problems from logs, the system comprising:
    a processor;
    a non-transitory computer-readable medium; and
    stored instructions translatable by the processor to perform:
        creating training data from logs used in an application development environment, the logs containing statements from a plurality of sources in an enterprise computing environment, the creating comprising taking a random sample of the statements in the logs and tagging log statements in the random sample with a plurality of predefined classifications;
        training a natural language processing (NLP) classifier model utilizing the log statements tagged with the plurality of predefined classification, the training producing a trained NLP classifier model, wherein the trained NLP classifier is adapted to classify log statements into one or more of the plurality of each predefined classifications based on an NLP feature associated with the log statements;
        classifying new log statements into the plurality of predefined classifications utilizing the trained NLP classifier model, the plurality of predefined classifications including a problem classification;
        identifying, from the new log statements thus classified, statements having the problem classification; and
        presenting the statements having the problem classification through a dashboard running in a browser.

9. The system of claim 8, wherein the statements contained in the logs from the plurality of sources comprise unstructured data that do not conform to any natural language.

10. The system of claim 8, wherein the plurality of predefined classifications comprises at least one of environment information, an execution result of a particular operation, a specific problem that caused program failure, or a generation information log statement.

11. The system of claim 8, wherein the training comprises parsing the training data, generating a frequency distribution of various words and phrases occurring in the log statements in the random sample, and computing, based on the frequency distribution, a probability of each of the log statements being classified into a given classification.

12. The system of claim 8, wherein the trained NLP classifier model is one of a plurality of trained models.

13. The system of claim 12, wherein outputs from the trained NLP classifier model are provided as input to another trained model of the plurality of trained models for identifying a type of problem associated with the statements having the problem classification.

14. The system of claim 8, wherein the plurality of classifications is specific to the application development environment.

15. A computer program product for diagnosing problems from logs, the computer program product comprising a non-transitory computer-readable medium storing instructions translatable by the processor to perform:
    creating training data from logs used in an application development environment, the logs containing statements from a plurality of sources in an enterprise computing environment, the creating comprising taking a random sample of the statements in the logs and tagging log statements in the random sample with a plurality of predefined classifications;

training a natural language processing (NLP) classifier model utilizing the log statements tagged with the plurality of predefined classification, the training producing a trained NLP classifier model, wherein the trained NLP classifier is adapted to classify log statements into one or more of the plurality of each predefined classifications based on an NLP feature associated with the log statements;

classifying new log statements into the plurality of predefined classifications utilizing the trained NLP classifier model, the plurality of predefined classifications including a problem classification;

identifying, from the new log statements thus classified, statements having the problem classification; and presenting the statements having the problem classification through a dashboard running in a browser.

16. The computer program product of claim 15, wherein the statements contained in the logs from the plurality of sources comprise unstructured data that do not conform to any natural language.

17. The computer program product of claim 15, wherein the plurality of predefined classifications comprises at least one of environment information, an execution result of a particular operation, a specific problem that caused program failure, or a generation information log statement.

18. The computer program product of claim 15, wherein the training comprises parsing the training data, generating a frequency distribution of various words and phrases occurring in the log statements in the random sample, and computing, based on the frequency distribution, a probability of each of the log statements being classified into a given classification.

19. The computer program product of claim 15, wherein the trained NLP classifier model is one of a plurality of trained models.

20. The computer program product of claim 15, wherein outputs from the trained NLP classifier model are provided as input to another trained model of the plurality of trained models for identifying a type of problem associated with the statements having the problem classification.

* * * * *